United States Patent
Kneuper et al.

(10) Patent No.: US 10,042,456 B2
(45) Date of Patent: Aug. 7, 2018

(54) USER INTERFACE FOR AN AIRCRAFT

(71) Applicant: Textron Innovations Inc., Providence, RI (US)

(72) Inventors: Jeremy Joseph Kneuper, Hesston, KS (US); Jason Michael Decker, Wichita, KS (US); Isaac Wayne Stanfield, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 221 days.

(21) Appl. No.: 14/643,594

(22) Filed: Mar. 10, 2015

(65) Prior Publication Data

US 2016/0004374 A1  Jan. 7, 2016

Related U.S. Application Data

(63) Continuation-in-part of application No. 14/642,256, filed on Mar. 9, 2015.
(Continued)

(51) Int. Cl.
*B64D 43/00* (2006.01)
*G06F 3/041* (2006.01)
(Continued)

(52) U.S. Cl.
CPC .......... *G06F 3/0416* (2013.01); *B64D 43/00* (2013.01); *G01C 23/00* (2013.01); *G06F 3/0484* (2013.01); *G06F 3/0488* (2013.01); *G06F 3/04817* (2013.01); *G08G 5/0021* (2013.01); *G08G 5/0091* (2013.01)

(58) Field of Classification Search
CPC ........ G06F 3/041; G06F 3/0412; B64D 43/00
See application file for complete search history.

(56) References Cited

U.S. PATENT DOCUMENTS 5,208,590 A  5/1993  Pitts
5,272,652 A  12/1993  Rosenshein et al.
(Continued)

FOREIGN PATENT DOCUMENTS

EP  2623935 A1  7/2013
WO  2011128835 A2  10/2011

OTHER PUBLICATIONS

D. Mangion, J. D. Loic Becouarn, M. Fabbri and J. Bader, "A Single Interactive Display Concept for Commercial and Business Jet Cockpits," 11th AIAA Aviation Technology, Integration and Operations (AIIO) Converance, Sep. 2011, Virginia Beach, VA.*
(Continued)

*Primary Examiner* — Peter D Nolan
(74) *Attorney, Agent, or Firm* — Erise IP, P.A.

(57) ABSTRACT

Systems and methods are described for controlling an aircraft. The systems and methods utilize a touch screen instrument panel to display information to pilots or other users, and to receive input from the user for controlling the aircraft and its components. The systems and methods include synoptic user interface panels that provide graphical or symbolic representations of the aircraft, its components, and subsystems, and display information regarding their configuration, condition, and status. The users may interact with the synoptic user interface panels through the touch screen instrument panel to control the various components of the aircraft.

26 Claims, 15 Drawing Sheets

Related U.S. Application Data

(60) Provisional application No. 61/951,189, filed on Mar. 11, 2014, provisional application No. 61/951,260, filed on Mar. 11, 2014, provisional application No. 61/951,231, filed on Mar. 11, 2014, provisional application No. 61/951,240, filed on Mar. 11, 2014, provisional application No. 61/951,243, filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014, provisional application No. 61/951,145, filed on Mar. 11, 2014.

(51) Int. Cl.
*G01C 23/00* (2006.01)
*G06F 3/0488* (2013.01)
*G06F 3/0484* (2013.01)
*G06F 3/0481* (2013.01)
*G08G 5/00* (2006.01)

(56) References Cited

U.S. PATENT DOCUMENTS

| | | | |
|---|---|---|---|
| 6,590,568 B1 | 7/2003 | Astala et al. | |
| 6,636,786 B2* | 10/2003 | Partel | B64D 45/00 |
| | | | 244/183 |
| 7,262,707 B2 | 8/2007 | Kaoh | |
| 7,382,288 B1 | 6/2008 | Wilson et al. | |
| 7,420,476 B2* | 9/2008 | Stiffler | G01C 23/00 |
| | | | 340/945 |
| 8,264,376 B1 | 9/2012 | McLoughlin et al. | |
| 8,380,366 B1 | 2/2013 | Schulte et al. | |
| 8,400,417 B2 | 3/2013 | Ording et al. | |
| 8,471,824 B2 | 6/2013 | Kim et al. | |
| 8,497,784 B1* | 7/2013 | Vandrovec | B64D 43/00 |
| | | | 340/945 |
| 8,515,658 B1 | 8/2013 | Foster et al. | |
| 8,564,544 B2 | 10/2013 | Jobs et al. | |
| 8,633,913 B1* | 1/2014 | Raghu | G08G 5/0021 |
| | | | 340/945 |
| 8,660,718 B2 | 2/2014 | Holder | |
| 8,983,688 B2* | 3/2015 | Servantie | B64D 45/00 |
| | | | 701/14 |
| 9,063,644 B2* | 6/2015 | Zeng | G06F 3/0488 |
| 9,128,594 B1* | 9/2015 | Hufnagel | G06F 3/04845 |
| 9,132,913 B1* | 9/2015 | Shapiro | B64C 19/00 |
| 9,245,242 B2 | 1/2016 | Arnold et al. | |
| 9,302,780 B2* | 4/2016 | Zaneboni | B64D 45/00 |
| 9,352,848 B2* | 5/2016 | Nikolic | B64D 43/00 |
| 9,478,140 B2 | 10/2016 | Kathirvel et al. | |
| 2001/0035832 A1 | 11/2001 | Block | |
| 2003/0078704 A1* | 4/2003 | Partel | B64D 45/00 |
| | | | 701/3 |
| 2003/0156046 A1 | 8/2003 | Dwyer | |
| 2004/0140959 A1 | 7/2004 | Matsumura et al. | |
| 2004/0236481 A1 | 11/2004 | Saint-Aroman et al. | |
| 2005/0007261 A1 | 1/2005 | Berson et al. | |
| 2006/0164261 A1* | 7/2006 | Stiffler | G01C 23/00 |
| | | | 340/945 |
| 2006/0238402 A1 | 10/2006 | Khatwa | |
| 2009/0112380 A1 | 4/2009 | Nutaro et al. | |
| 2009/0326744 A1 | 12/2009 | He et al. | |
| 2010/0127847 A1* | 5/2010 | Evans | G06F 3/04817 |
| | | | 340/461 |
| 2010/0141482 A1 | 6/2010 | Wyatt et al. | |
| 2010/0156809 A1* | 6/2010 | Nutaro | G06F 3/0488 |
| | | | 345/173 |
| 2010/0194602 A1 | 8/2010 | Engels et al. | |
| 2010/0211237 A1 | 8/2010 | Nichols et al. | |
| 2010/0231418 A1 | 9/2010 | Whitlow et al. | |
| 2010/0250030 A1 | 9/2010 | Nichols et al. | |
| 2010/0256863 A1 | 10/2010 | Nielsen et al. | |
| 2010/0265268 A1 | 10/2010 | Wilson et al. | |
| 2010/0283635 A1 | 11/2010 | Brinkman et al. | |
| 2011/0025530 A1 | 2/2011 | He | |
| 2011/0066362 A1 | 3/2011 | He | |
| 2011/0193694 A1 | 4/2011 | Bowden et al. | |
| 2011/0196598 A1 | 8/2011 | Feyereisen et al. | |
| 2011/0241901 A1 | 10/2011 | Firra | |
| 2011/0313597 A1 | 12/2011 | Wilson et al. | |
| 2012/0026190 A1 | 2/2012 | He et al. | |
| 2012/0105335 A1* | 5/2012 | Suddreth | G06F 3/041 |
| | | | 345/173 |
| 2012/0211543 A1 | 8/2012 | Subbu et al. | |
| 2012/0265372 A1 | 10/2012 | Hedrick | |
| 2013/0006511 A1 | 1/2013 | Ramaiah et al. | |
| 2013/0027226 A1 | 1/2013 | Cabos | |
| 2013/0076540 A1 | 3/2013 | McLoughlin et al. | |
| 2013/0162632 A1 | 6/2013 | Varga et al. | |
| 2013/0231804 A1* | 9/2013 | Servantie | B64D 45/00 |
| | | | 701/14 |
| 2013/0245860 A1 | 9/2013 | Cooper | |
| 2013/0249814 A1* | 9/2013 | Zeng | G06F 3/0488 |
| | | | 345/173 |
| 2013/0314328 A1* | 11/2013 | Singer | G06F 3/0488 |
| | | | 345/173 |
| 2014/0053101 A1* | 2/2014 | Buehler | G09G 5/14 |
| | | | 715/802 |
| 2014/0062893 A1* | 3/2014 | Kawalkar | G06F 3/0488 |
| | | | 345/173 |
| 2014/0172204 A1 | 6/2014 | Coulmeau et al. | |
| 2014/0200748 A1* | 7/2014 | Porez | G05B 15/02 |
| | | | 701/3 |
| 2014/0285661 A1 | 9/2014 | Feyereisen et al. | |
| 2014/0300508 A1 | 10/2014 | Booher et al. | |
| 2014/0300555 A1* | 10/2014 | Rogers | G06F 3/0488 |
| | | | 345/173 |
| 2014/0309821 A1 | 10/2014 | Poux et al. | |
| 2014/0335797 A1 | 11/2014 | Cooper | |
| 2014/0347197 A1 | 11/2014 | Boomgarden et al. | |
| 2015/0004374 A1 | 1/2015 | Nahm et al. | |
| 2015/0015698 A1 | 1/2015 | Knight | |
| 2015/0040066 A1* | 2/2015 | Baron | G09B 9/165 |
| | | | 715/810 |
| 2015/0123912 A1* | 5/2015 | Nikolic | B64D 43/00 |
| | | | 345/173 |
| 2015/0210388 A1 | 7/2015 | Criado et al. | |
| 2015/0217856 A1* | 8/2015 | Mesguen | B64C 19/00 |
| | | | 701/3 |
| 2015/0262545 A1 | 9/2015 | Kneuper et al. | |
| 2015/0286396 A1* | 10/2015 | Zeng | G06F 3/0488 |
| | | | 715/773 |
| 2015/0352952 A1 | 12/2015 | Kneuper et al. | |
| 2016/0049080 A1 | 2/2016 | Bazawada et al. | |

OTHER PUBLICATIONS

G. Hines, Z. Rahman, D. Jobson, G. Woodell and S. Harrah, "Real-time Enhanced Vision System," SPIE Defense and Security Symposium 2005, Apr. 2005, Orlando, FL.*

U.S. Appl. No. 14/643,510, Office Action dated Feb. 18, 2016, 24 pages.

(56) References Cited

OTHER PUBLICATIONS

International Search Report and Written Opinion issued in PCT/US2015/019437, dated Jun. 18, 2015, 14 pages.

* cited by examiner

USER INTERFACE FOR AN AIRCRAFT

CROSS REFERENCE TO RELATED APPLICATIONS

This application is a continuation-in-part of U.S. patent application Ser. No. 14/642,256, entitled "Touch Screen Instrument Panel", filed Mar. 9, 2015, which claims the benefit of each of U.S. Provisional Application No. 61/951,145, entitled "3D Weather", U.S. Provisional Application No. 61/951,189, entitled "HD Camera", U.S. Provisional Application No. 61/951,260, entitled "Adjustable Synthetic Vision System", U.S. Provisional Application No. 61/951,231, entitled "Skytrak Navigational Aid", U.S. Provisional Application No. 61/951,240, entitled "Smart Airport Application", U.S. Provisional Application No. 61/951,243, entitled "Smart Traffic Application", U.S. Provisional Application No. 61/951,157, entitled "Chart Synoptic Window", U.S. Provisional Application No. 61/951,168 entitled "Flight Planning Synoptic Window", U.S. Provisional Application No. 61/951,201 entitled "Intelligent Radio Frequency Identifiers", U.S. Provisional Application No. 61/951,152, entitled "Crew Alerting System", U.S. Provisional Application No. 61/951,195 entitled "Historical Data Feature", U.S. Provisional Application No. 61/951,208 entitled "Maintenance Synoptic Window", U.S. Provisional Application No. 61/951,220 entitled "Master Warning/Master Caution", U.S. Provisional Application No. 61/951,234 entitled "Proximity Icon", U.S. Provisional Application No. 61/951,166 entitled "Flight Control Synoptic Window", U.S. Provisional Application No. 61/951,215 entitled "Mode Controller and Engine Indication Icon", U.S. Provisional Application No. 61/951,253 entitled "Synoptic Window Layout", U.S. Provisional Application No. 61/951,216 entitled "Moveable Synoptic Pages", U.S. Provisional Application No. 61/951,223 entitled "Pinnable Synoptic Pages", all filed Mar. 11, 2014.

BACKGROUND

Field of the Invention

The user interface for an aircraft and related systems and methods are in the field of aircraft control systems. More specifically, the systems and methods are in the field of instrument panels for an aircraft. More specifically, the systems and methods are in the field of touch screen instrument panels and user interface systems and methods for touch screen instrument panels.

Description of the Related Art

Aircraft instrument panels are largely composed of instruments dedicated to a single purpose, such as displaying a single piece of information or receiving a specific type of control input from a user. These instruments typically include gauges, dials, buttons, switches, text or graphic display monitors, and other similar components. As a result of their single purpose and physical arrangement, the instrument panel has limited flexibility and customizability. The instruments are in fixed locations and are limited in what information they can display or input they can receive from the user.

Also, since typically an aircraft must provide functionality for both a pilot and a co-pilot, the instrument panel includes duplicate instruments to provide for two users. This reduces the effective area of the instrument panel available for the display of information.

A flexible, customizable instrument panel, utilizing touch screen technology and providing a user friendly, intuitive interface for receiving information and controlling the aircraft are described. A user interface that provides a synoptic, summary overview of the aircraft configuration and operation is also described.

SUMMARY OF THE INVENTION

In some embodiments, the invention comprises a method for controlling an aircraft having a touch screen instrument panel. An onboard computer is connected to the touch screen instrument panel. The inventive method includes the steps of displaying a synoptic user interface panel on a portion the touch screen instrument panel, providing information about the aircraft from the onboard computer on the at least one synoptic user interface panel, and receiving control input to the onboard computer through the at least one synoptic user interface panel. In some embodiments, the method further involves modifying the state of the aircraft in response to the control input.

In some embodiments, the synoptic user interface panel includes a depiction of all or a portion of an aircraft and associates one or more display elements associated with the graphical depiction of the aircraft. In some embodiments, the panel graphically depicts an aircraft, and in some embodiments the panel symbolically depicts an aircraft. The panel may include both graphically and symbolically depicted elements.

In various embodiments the display elements depict components of the aircraft, and show them in relation to the graphical depiction of the aircraft on the synoptic user interface panel. In some embodiments, the method includes displaying information on the synoptic user interface panel from the onboard computer about a component of the aircraft in relation to the display element depicting the component.

In other embodiments, the system receives control input by sensing a touch input on the portion of the touch screen instrument panel on which the synoptic user interface panel is displayed; and determining a display element associated with the touch input.

The method of controlling the aircraft may also include modifying the state of the aircraft by determining the component of the aircraft depicted by the display element associated with the touch input, and modifying the state of the component of the aircraft in response to the touch input.

In some embodiments, the system automatically updates the information from the onboard computer that is displayed on the display element to represent the state of the aircraft. In varying embodiments, the display elements are automatically modified by altering the color, text or numerical value, shape, or configuration of the display element to represent the state of the aircraft.

The synoptic user interface panel in some embodiments are selected from the group consisting of an anti-icing systems panel, an environmental control systems panel, an electrical systems panel, a flight control panel, an hydraulic systems panel, an exterior light panel, an oxygen systems panel, a cabin pressurization panel, a propulsion systems panel, an internal light panel, and a cabin window shade panel.

To allow for customization of the instrument panel, some embodiments allow a user to drag a synoptic user interface panel to a desired location on the touch screen instrument panel. In some embodiments, the user can pin the user interface panel in a desire location by actuating an icon displayed in the synoptic user interface panel thereby preventing the synoptic user interface panel from being moved from the desired location. Then the user may touch the touch screen instrument panel in the area depicting the synoptic user interface panel to manipulate the information provided on the synoptic user interface panel. When the user is finished manipulating the information in the user interface panel, the user may actuate the icon to unpin the at least one user interface panel allowing the panel to be moved from the desired location. In some embodiments of the user interface, one user interface panel may overlay a second user interface panel.

In some embodiments, the display element depicts a control surface of the aircraft; and the system modifies the aircraft in response to input by repositioning the control surface. In some of those embodiments, the display element depicts an internal or external light and actuating it modifies the state of the aircraft by turning the internal or external light on or off. In other embodiments, the display element depicts an electrical component, and actuating it modifies the state of the aircraft by actuating the electrical component. In some of those embodiments, the electrical component is a power generator, a relay, or an electrical bus. In other embodiments, the display element depicts a hydraulic valve, a pneumatic valve, or a fuel valve, and actuating it modifies the state of the aircraft by opening or closing the valve.

In some embodiments, the display element is an icon associated with the depiction of all or a portion of an aircraft. In some of those embodiments, receiving control input comprises sensing a touch input on the icon. In some the embodiments, the icon is associated with an anti-icing system, and actuating the icon modifies the state of the aircraft by turning the anti-icing system on or off. In other embodiments, the icon is associated with the temperature of a portion of the aircraft, and actuating the icon modifies the state of the aircraft by increasing or decreasing the temperature settings for the portion of the aircraft.

In some embodiments, the icon is associated with the position of a control surface for the aircraft, and actuating the icon modifies the state of the aircraft by repositioning the control surface.

In other embodiments, the icon is associated with an aircraft system selected from a hydraulic system, a lighting system, an oxygen system, a climate control system, a fuel system, and a cabin control system, and the step of modifying the state of the aircraft comprises modifying a component in the aircraft system.

DETAILED DESCRIPTION OF THE INVENTION

Figure 1:
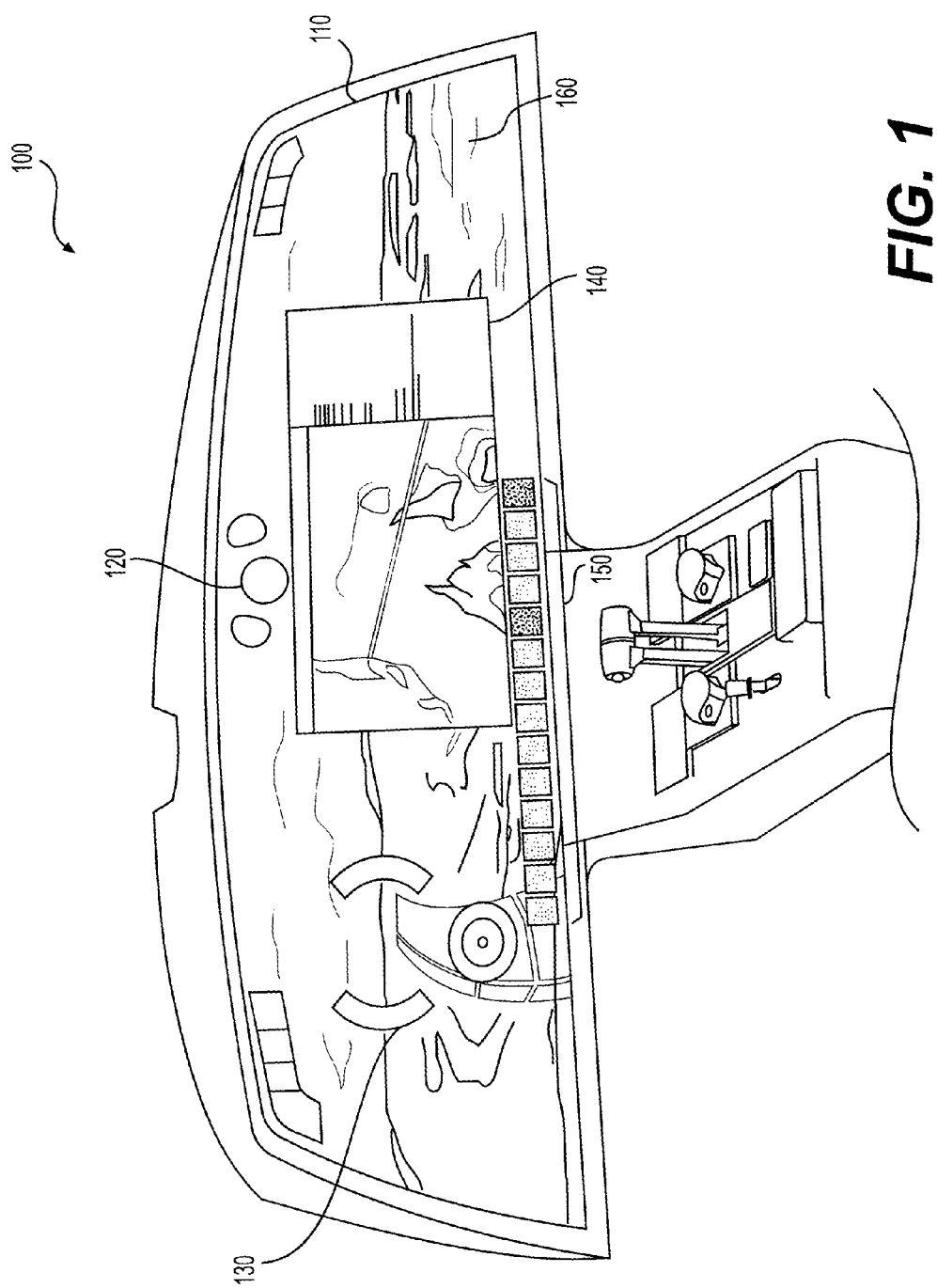
FIG. 1 depicts a perspective view of an embodiment of a touch-screen instrument panel system for an aircraft.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer becomes transparent so that the standby flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users have easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, the user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather informational pop-up. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
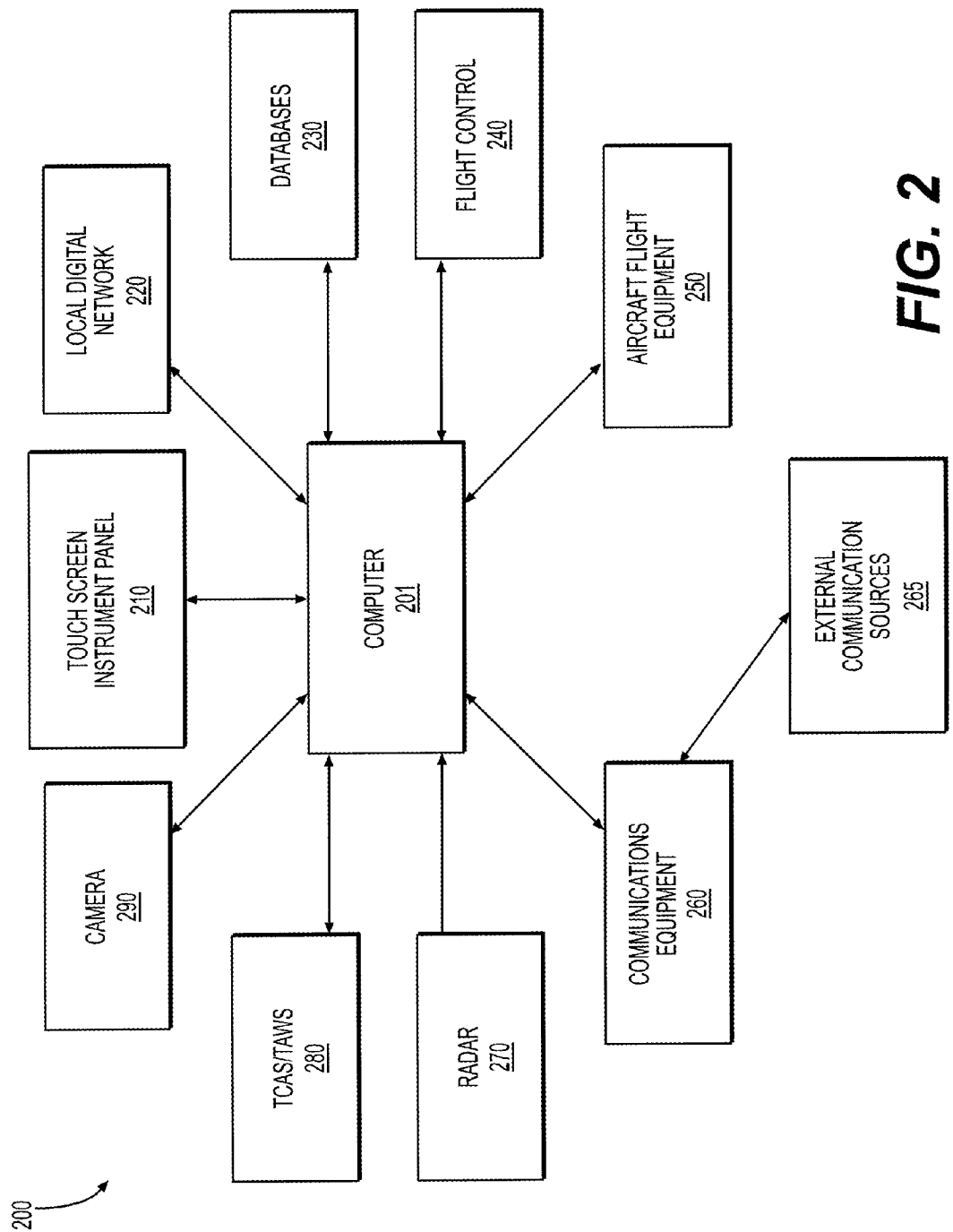
FIG. 2 depicts a system diagram for an embodiment of a touch-screen instrument panel system for an aircraft.

FIG. 2 shows one embodiment of a system environment 200 including an aircraft touch-screen instrument panel 210. System environment 200 has a network of subsystems that includes an on-board computer 201, the touch-screen instrument panel (TSIP) 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processors provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as curves or corners. In an embodiment, the substrate has a large aspect ratio for providing panoramic images. Display is for example an organic light-emitting diode (OLED) display, which is thin and flexible for layering onto substrate. When unpowered, the display is, in some embodiments, transparent. Touch membrane is a thin, transparent and flexible material that is layered onto a display and capable of sensing touch. Touch membrane is for example a resistive, capacitive, optical, or infrared touch screen. Together, touch membrane and display provide TSIP 210 with a visual display that a user may control by touching with one or more fingers or a stylus. Such a touch comprises a touch input to the TSIP 210 which is sensed by the TSIP 210 and allows interaction with onboard computer 201. In some embodiments, TSIP 210 is a multi-touch display that allows multiple users to touch and interact with the TSIP 210 simultaneously. For example, in some embodiments, both a pilot and a co-pilot may simultaneously touch and interact with TSIP 210 through different windows or controls displayed on TSIP 210.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, anti-icing equipment, lights, and sensors (e.g., temperature, pressure, electrical). Aircraft flight equipment 250 is monitored and controlled by pilots using TSIP 210 through computer 201 for flying the aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the state or condition of the aircraft, meaning that the user interface components provide an intuitive, broad view of the aircraft, its various components and subsystems, and their configuration, condition, and status. The user interface utilizes the touch screen functionality of the TSIP 210 to present views of the aircraft to intuitively communicate information and accept input from the pilot. In some embodiments, the views also include graphical depictions of all or a relevant portion of the aircraft. In some embodiments, the views of the aircraft also incorporate display elements, including without limitation graphical, textual, and numerical elements, in conjunction and associated with graphical depictions of the aircraft to convey the state of the aircraft and to simultaneously convey multiple pieces of information to the pilot or user. The graphical, textual, and numerical elements of the user interface may flash, change color, change content, appear, disappear, move or change location, or otherwise change in response to user input or the state of the aircraft systems. The varying colors, values, or appearances of the display element symbolize or represent the state of the aircraft and its various systems. Some of the display elements may function as input elements such as buttons or text or number entry fields, receiving input from a user through TSIP 210.

The computer 201 monitors the aircraft's data buses to determine the positions, temperatures, pressures, and states of various equipment and systems of the aircraft. The TSIP 210 graphically displays the data gleaned from the buses and stored in computer 201 in the appropriate synoptic panels or windows for flight crew interaction. The inventive user interface provides a thorough, easily understood, intuitive and user-friendly interaction with each synoptic user interface. The touch screen functionality of the TSIP 210 also allows the user to activate aircraft systems and change configuration settings through user interface displayed on the TSIP 210.

The user interface provides for a variety of user interface elements grouped into a variety of "windows", which may also be referred to as "panels" or "pages". Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on the TSIP 210. Various embodiments of the panels that are presented in the TSIP 210 are described in relation to FIGS. 3A through 3M.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration and status. Active controls may be updated automatically by the system to display the current aircraft configuration and status, but are also capable of interacting with the user via the TSIP 210 to receive pilot input.

Figure 3A:
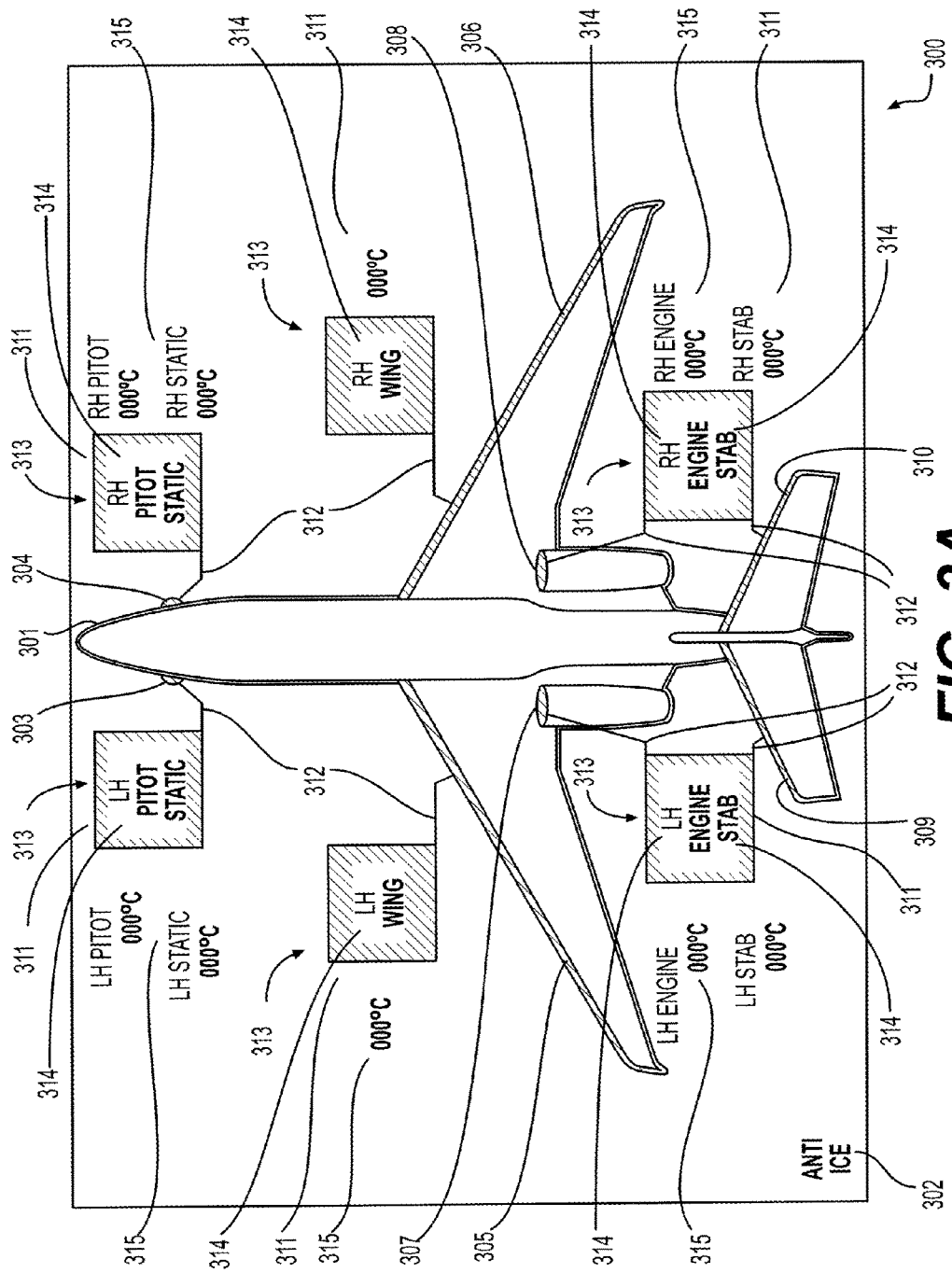
FIG. 3A depicts an embodiment of a synoptic user interface for aircraft anti-icing systems information 300.

FIG. 3A depicts an embodiment of a synoptic user interface panel for aircraft anti-icing systems information 300. The user interface depicts a top view 301 of an aircraft. The title 302 is displayed in the lower left corner of the window, though in other embodiments it may be located elsewhere or not provided at all. Various components of the anti-icing systems of the aircraft are depicted on top view 301 in relation to their actual location on the aircraft. In the depicted embodiment, these systems include pitot tubes 303 and 304, wing anti-icing systems 305 and 306, engine inlets 307 and 308, and stabilizer anti-icing systems 309 and 310. The anti-icing systems are shown on top view 301 in their general location on an actual aircraft. In some embodiments, the color of each of the systems 303 through 310 on top view 301 may be modified individually to provide a status for each anti-icing system. In some embodiments, the systems are depicted in green to convey normal operation, in yellow to convey a warning state, and red or amber to convey an alarm state for the anti-icing system. In some embodiments, systems 303 through 310 may be green to indicate that the anti-icing system is active and gray or transparent to indicate that the system is currently inactive.

In the depicted embodiment, status information 311 is provided for each anti-icing system and linked by line 312 to the applicable anti-icing system. In the depicted embodiment, the status information 311 includes a panel 313 with a background color that conveys the status of the relevant anti-icing system. The panel 313 may also include text 314 such as the name of the anti-icing system or other relevant information. In the depicted embodiment, the text comprises the names of each system, such as left hand and right hand pitot-static systems, left hand and right hand wing anti-icing systems, left hand and right hand engine inlet anti-icing systems, and left hand and right hand stabilizer anti-icing systems. In addition to the text on the panel 313, other text or numeric data may also be provided, such as temperatures 315. In the depicted embodiments, the temperatures of the various systems are displayed as an indicator of the operation of each anti-icing system.

Figure 3B:
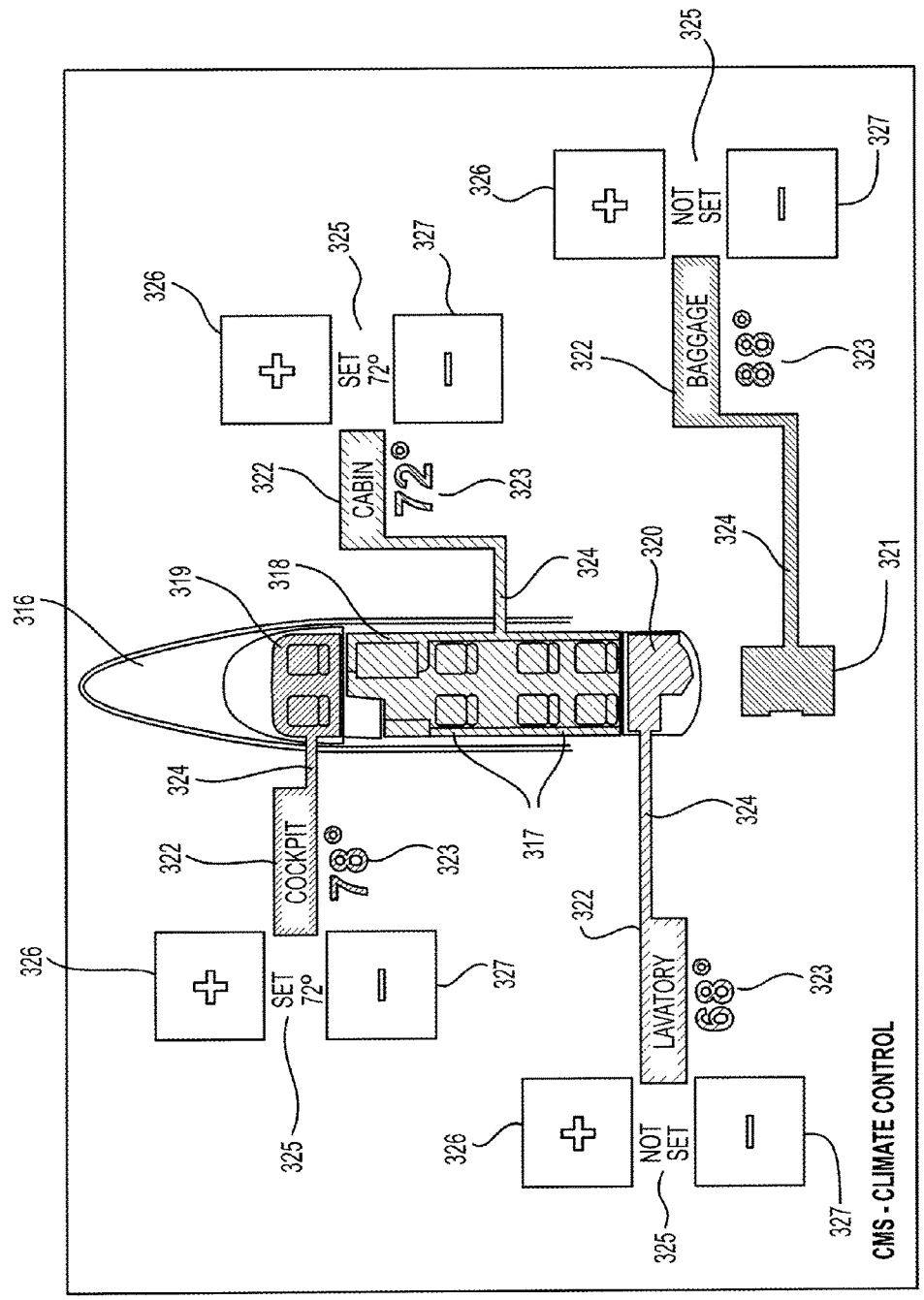
FIG. 3B depicts an embodiment of a synoptic user interface for an aircraft environmental control system.

FIG. 3B depicts an embodiment of a synoptic user interface panel for aircraft environmental control system. The depicted embodiment displays the temperature in various climate zones disposed in various parts of the aircraft. A top view or top cross-sectional view 316 of all or a relevant portion of an aircraft is provided. The top view may be a partial view as appropriate to cover all the zones of the aircraft provided with climate control. In some embodiments the location of seats may be depicted with seat icons 317 in cabin 318. The location of the cockpit 319 and lavatory 320 may also be depicted. The baggage area may also be depicted as part of the top view 316 of the aircraft, or via a symbol 321. Other climate zones may also be depicted as appropriate for the aircraft. Each climate zone may be depicted with a color that is indicative of the temperature in the various areas of the aircraft. In the depicted embodiment, the colors are selected on a range of color to provide a graphical indication of temperature. In some embodiments, the colors range between two complementary colors. In some embodiments the range of colors is disposed between a reddish color and a complementary blue green color. In other embodiments the range of colors may between non-complementary colors such as red and blue. In some embodiments, the red color depicts higher temperatures and blue depicts lower temperatures.

Each climate area may be provided with status information. Status information may include a label 322 for each climate zone such as "Cockpit", "Cabin", "Lavatory", or "Baggage". It may also include a numerical indication 323 of the measured temperature in the relevant climate zone. It may also include a text or numerical indication 325 to indicate the current temperature setting for the relevant climate zone. The status information may be linked to the relevant climate zone by a line 324. In some embodiments, the line, the background of the status information, or the text of the status information may be in the color that corresponds to the temperature of the relevant climate zone. In some embodiments, control elements are provided for some or all of the climate zones in the aircraft. The control elements may include control input icons 326 and 327 to receive user input through the touch screen functionality of the TSIP 210. One area 326 may be provided to increase the set temperature for the appropriate climate zone, and another area 327 may be provided to decrease the set temperature for the appropriate climate zone.

Figure 3C:
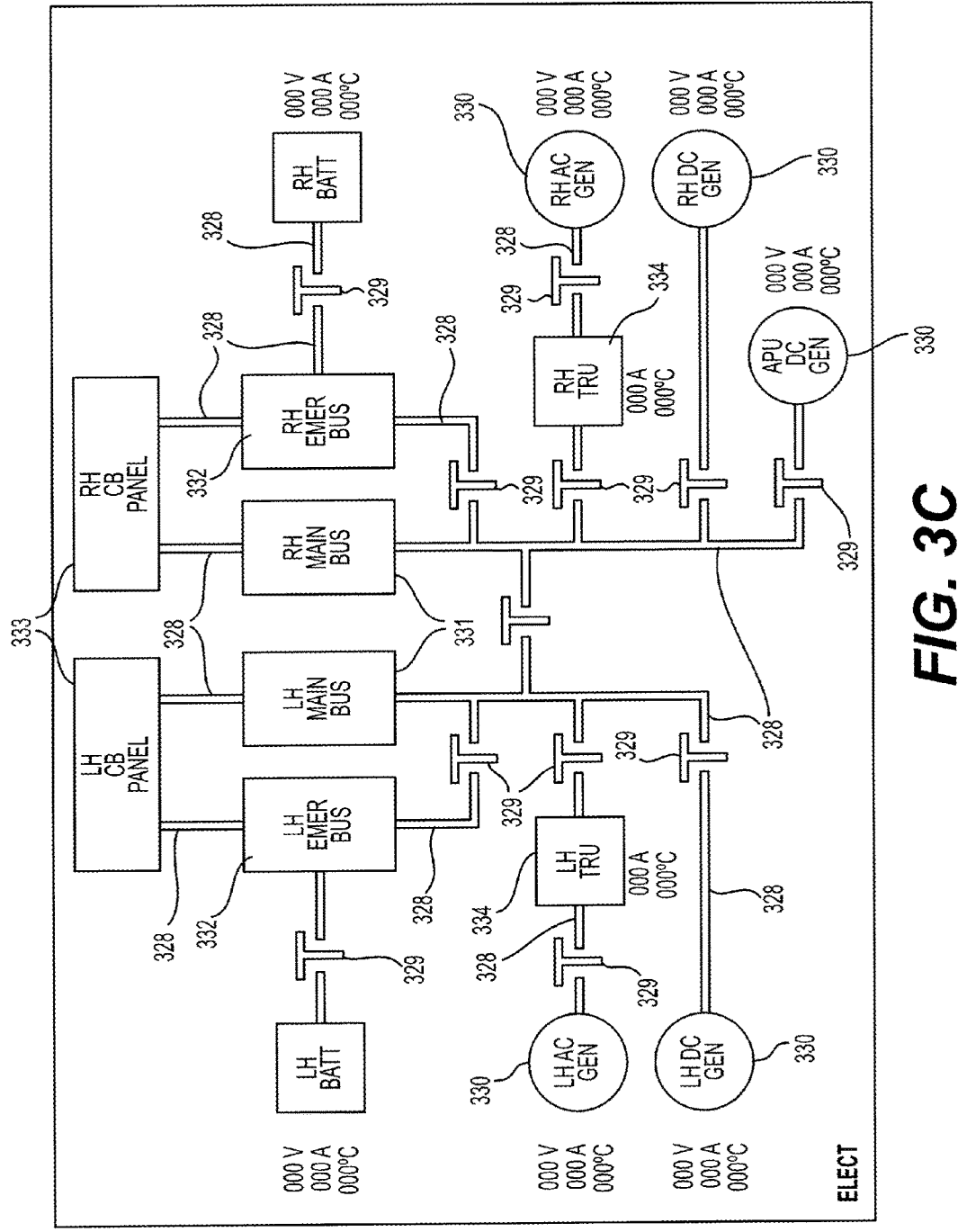
FIG. 3C depicts an embodiment of a synoptic user interface for an aircraft electrical buss structure.

FIG. 3C depicts an embodiment of a synoptic user interface panel for aircraft electrical systems. In this embodiment, a symbolic top view of the aircraft is presented by the user interface. The electrical busing structure is displayed showing main buses from all power sources. Connections 328 depict electrical connections between the various components. The color of the connection 328 may indicate whether or not electricity is flowing through the branch. In one embodiment, connections 328 that are green indicate that electricity is flowing through the connection, and connections that are grey indicate that electricity is not flowing through the connection. In some embodiments, relays 329 are depicted on the connections 328. In the depicted embodiment, the relays are depicted as a "T"-shaped icon and the color of the icon indicates if the relay is engaged (green) or disengaged (grey).

In some embodiments, a circle icon 330 indicates a power plant such as a generator. In the depicted embodiment, voltages, amperages, and temperatures are displayed at each power source, including power plants and batteries. In some embodiments, a square icon indicates a switch to turn described equipment on or off. In some embodiments, a rectangle icon indicates an item that can be explored further by touching it to expand the item.

In the depicted embodiment the buses include left hand and right hand main buses 331 and left hand and right hand emergency buses 332. The buses are connected to right hand and left hand electrical panels 333 to distribute electrical energy to various systems on the aircraft. Other components, such as transformer rectifier units 334, may also be depicted along with information regarding the performance of the unit including current flow and temperature.

Figure 3D:
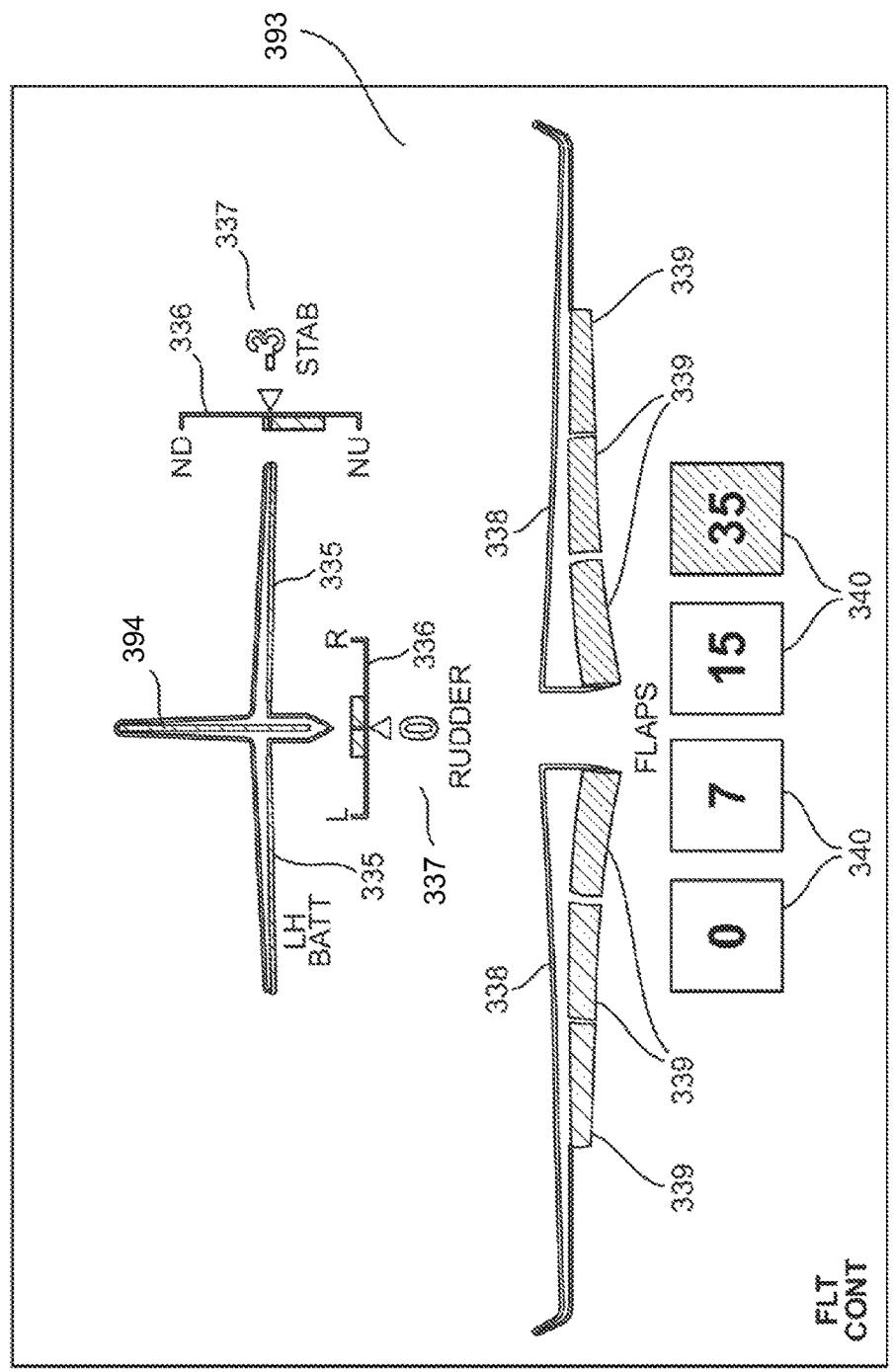
FIG. 3D depicts an embodiment of a synoptic user interface for aircraft flight controls.

FIG. 3D depicts an embodiment of a synoptic user interface panel for aircraft flight controls. This user interface provides a view of the position of various flight control surfaces on the aircraft. In this embodiment, a back view 393 of the horizontal and vertical stabilizers and wings is depicted. The horizontal and vertical stabilizers are graphically displayed, and show the state of the rudder 394, elevators 335, and stabilizer trim position. A graphical depiction 336 of the operational range and a numerical depiction 337 of the current position of each element may also be depicted.

In some embodiments, the trailing edges of the wings 338 are graphically displayed, and show the state of the aircraft's flaps 339. In some aircraft, the flaps are adjustable to discrete positions. In the depicted embodiment, the flaps can be adjusted to four different angles: 0, 7, 15, and 35. These discrete positions may be provided as buttons 340. The button corresponding to the current setting of the flaps may be highlighted green or some other color to indicate the flap position. The pilot may adjust the flaps by touching one of the other discrete flap settings. As the flaps on the aircraft extend, the graphical representation also alters to provide feedback to the pilot that all flap surfaces are extended correctly, and may change color to indicate a failure to extend or retract to the desired setting. Text labels may also be provided for the various control surfaces, and the control surfaces may be depicted in various colors to highlight their position or indicate their current functionality.

Figure 3E:
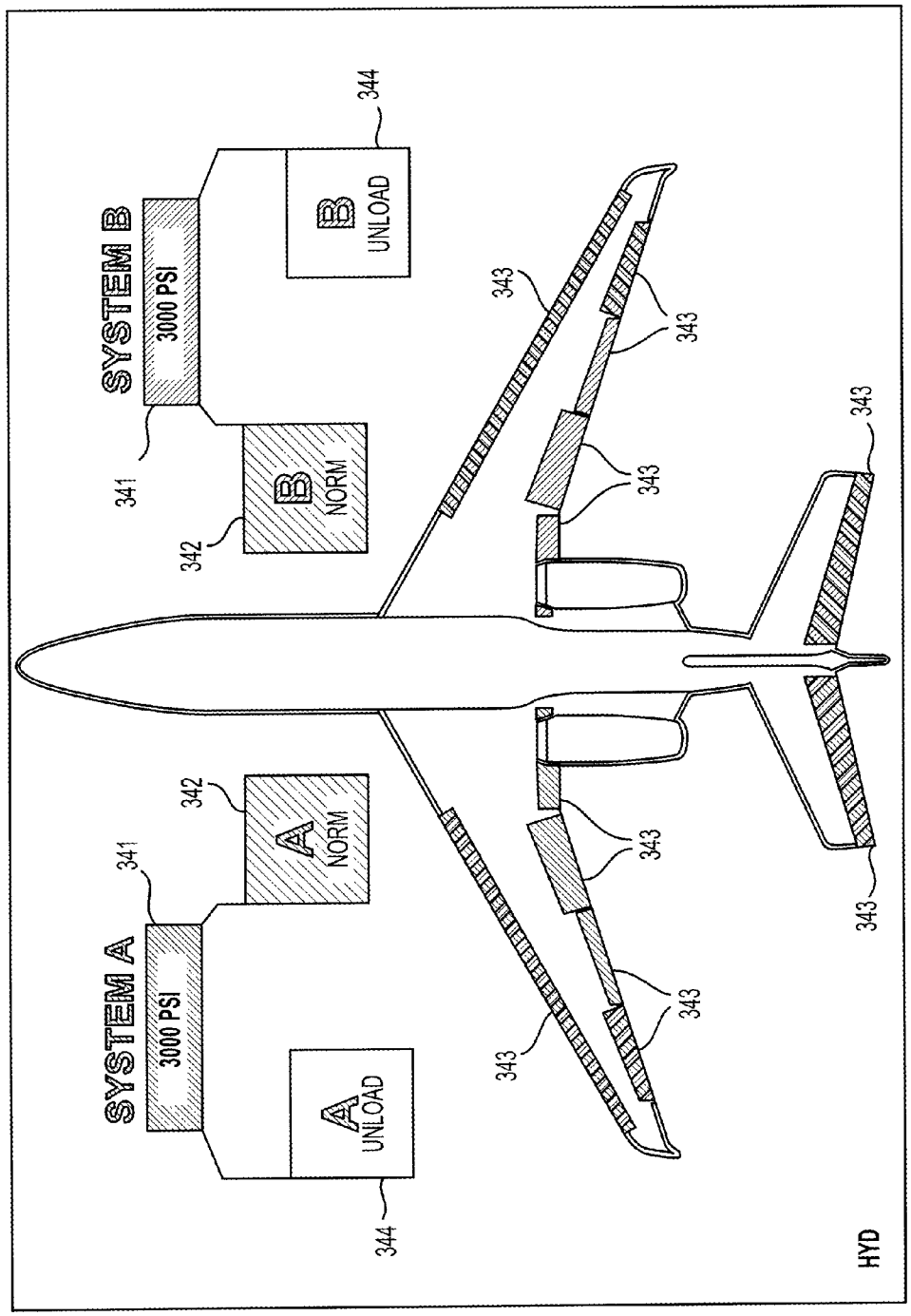
FIG. 3E depicts an embodiment of a synoptic user interface for aircraft hydraulic systems.

FIG. 3E depicts an embodiment of a synoptic user interface panel for hydraulic systems. A top view of the aircraft illustrating the aircraft's hydraulic systems is shown. In the depicted embodiment, the aircraft has dual A and B hydraulic systems connected to various flight control surfaces. In the depicted embodiment, a unique color is associated with each system, though shading or cross-hatching might be used instead of a unique color. In the depicted embodiment, each system has status elements 341 such as title and pressure reading, and status panel 342. The color of status panel 342 may be modified to visually indicate the status of each hydraulic system, such as green for normal condition, yellow for warning, and red or amber for malfunction. The flight control surfaces 343 may be highlighted in the color for the system that actuates the control. For flight control surfaces that are controlled by both systems, a cross-hatch pattern of both system colors may be displayed on the surface. A button 344 on the touch screen may be provided for actuating an unloading valve to relieve pressure from the hydraulic system.

Figure 3F:
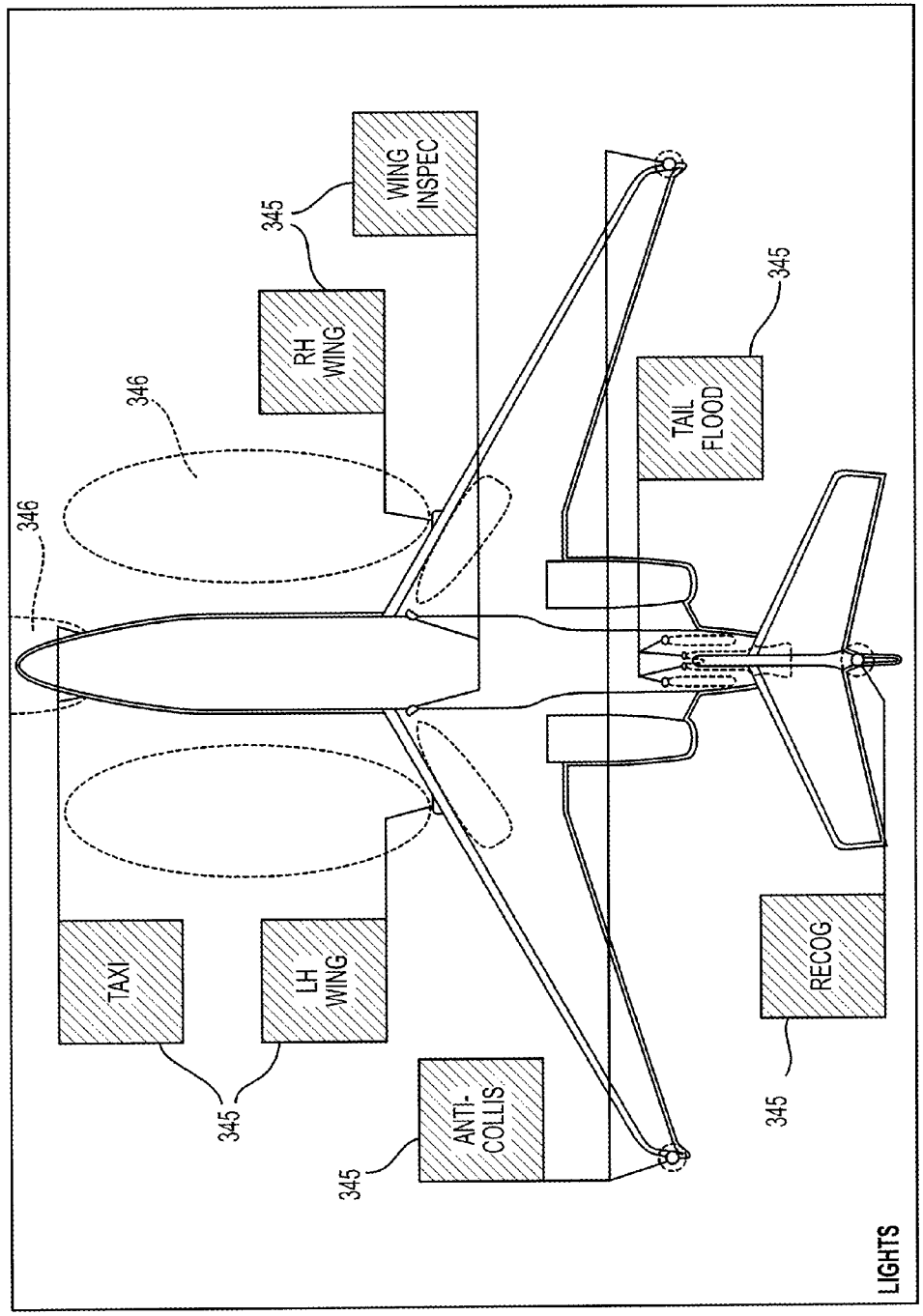
FIG. 3F depicts an embodiment of a synoptic user interface for aircraft exterior lights.

FIG. 3F depicts an embodiment of a synoptic user interface panel for aircraft exterior lights. In the depicted embodiment, a top view of the aircraft is shown with the location of each exterior light indicated by a button 345. When the light is on it is shown with a light 346 cast on to the area the light covers (as in the case of the landing, wing inspection, and tail flood lights) and the color of the light (such as red and green for the anti-collision and recognition lights). When the light is off, light is not cast from the light's location on the graphical display of the silhouetted aircraft. Buttons 345 may be depicted with a color to indicate that the light is on, such as green. The pilot may turn each light off and on by touching the button 345.

Figure 3G:
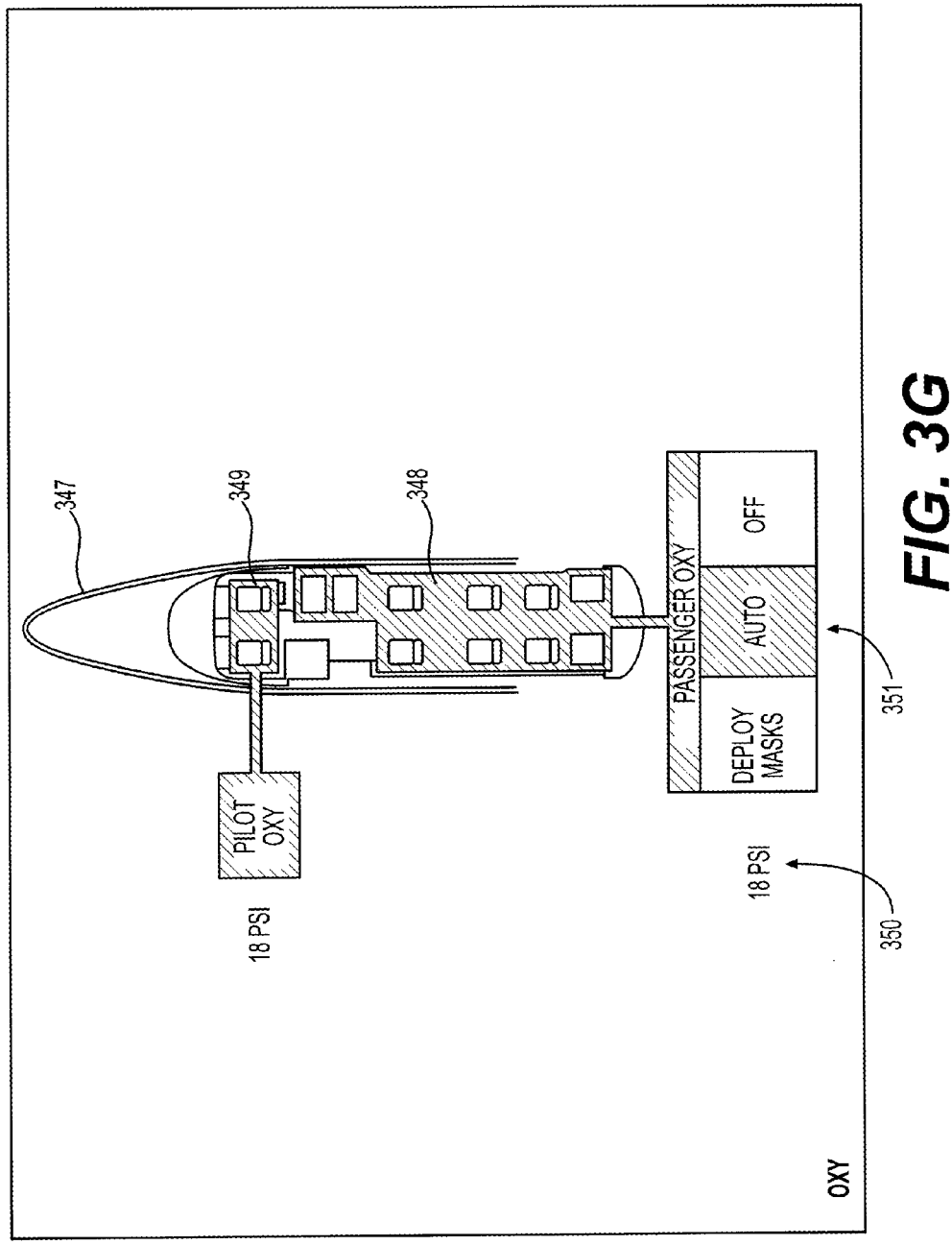
FIG. 3G depicts an embodiment of a synoptic user interface for aircraft oxygen systems.

FIG. 3G depicts an embodiment of a synoptic user interface panel for aircraft oxygen systems. Top view 347 of the aircraft cockpit 349 and cabin 348, and possibly other areas provided with oxygen systems, displays the state of the emergency oxygen system. In the depicted embodiment, a zone is highlighted with green to indicate that the oxygen system is on. Similarly, a zone is not highlighted, but filled with gray to indicate that the oxygen system for that zone is off. Textual information 350 may be provided to communicate additional information regarding oxygen systems such as the current pressure of oxygen in the system. An active control such as toggle buttons 351 may be provided to allow the pilots to toggle the oxygen system between automatic function, manual deployment, and full off.

Figure 3H:
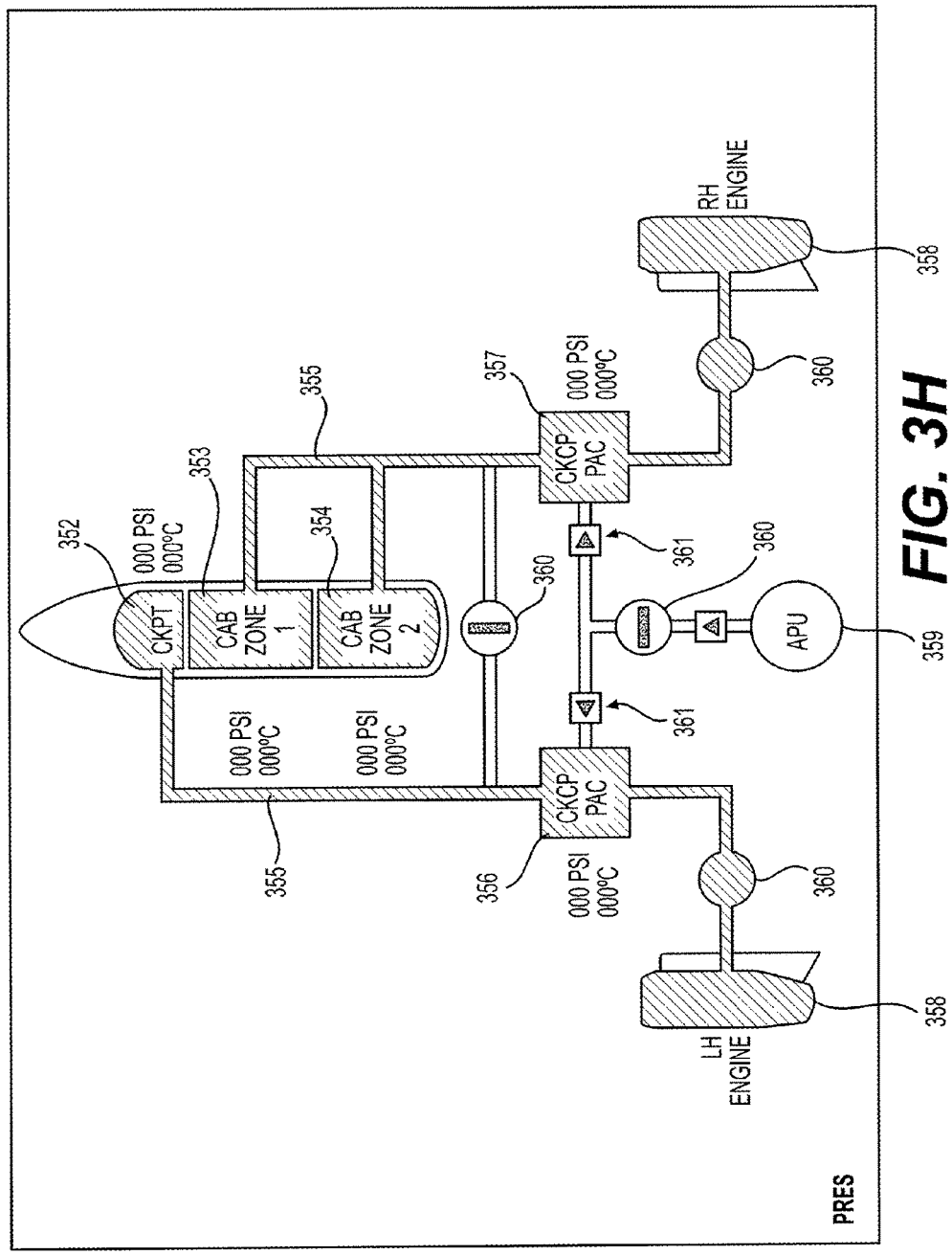
FIG. 3H depicts an embodiment of a synoptic user interface for cabin pressurization systems.

FIG. 3H depicts an embodiment of a synoptic user interface panel for cabin pressurization systems. Various pressurization zones of the aircraft may be depicted separately, such as cockpit 352, and one or more cabin pressurization zones 353 and 354. Various text elements may be provided on the user interface to convey the pressure and temperature of each zone or of other elements of the cabin pressurization system. The various zones are connected to pressurized air sources 358 and 359 by pressure lines 355. The pressurized air systems may be provided with pneumatic air conditioning systems 356 and 357 to cool, decompress, and mix the pressurized air prior to its circulation through the cabin. In the depicted user interface, the aircraft is provided with two engines 358 which provide pressurized bleed air to the conditioning systems 356 and 357. An auxiliary power unit 359 may also provide pressurized air, for example, when the aircraft is on the ground and the engines are off. Valve icons 360 are depicted and the icon indicates if it is open or closed. In some embodiments, a user may be able to actuate a valve by touching the valve icon 360 on the TSIP 210. Additional items such as check valves 361 may also be represented on the user interface. The color of the zone, pressurized line, condition unit, valve or air source may be modified to indicate if the component is functioning normally. As in other embodiments of the synoptic windows, green may indicate a component functioning within normal parameters, while gray may indicate a component that is not currently active and other colors may indicate component failures.

Figure 3I:
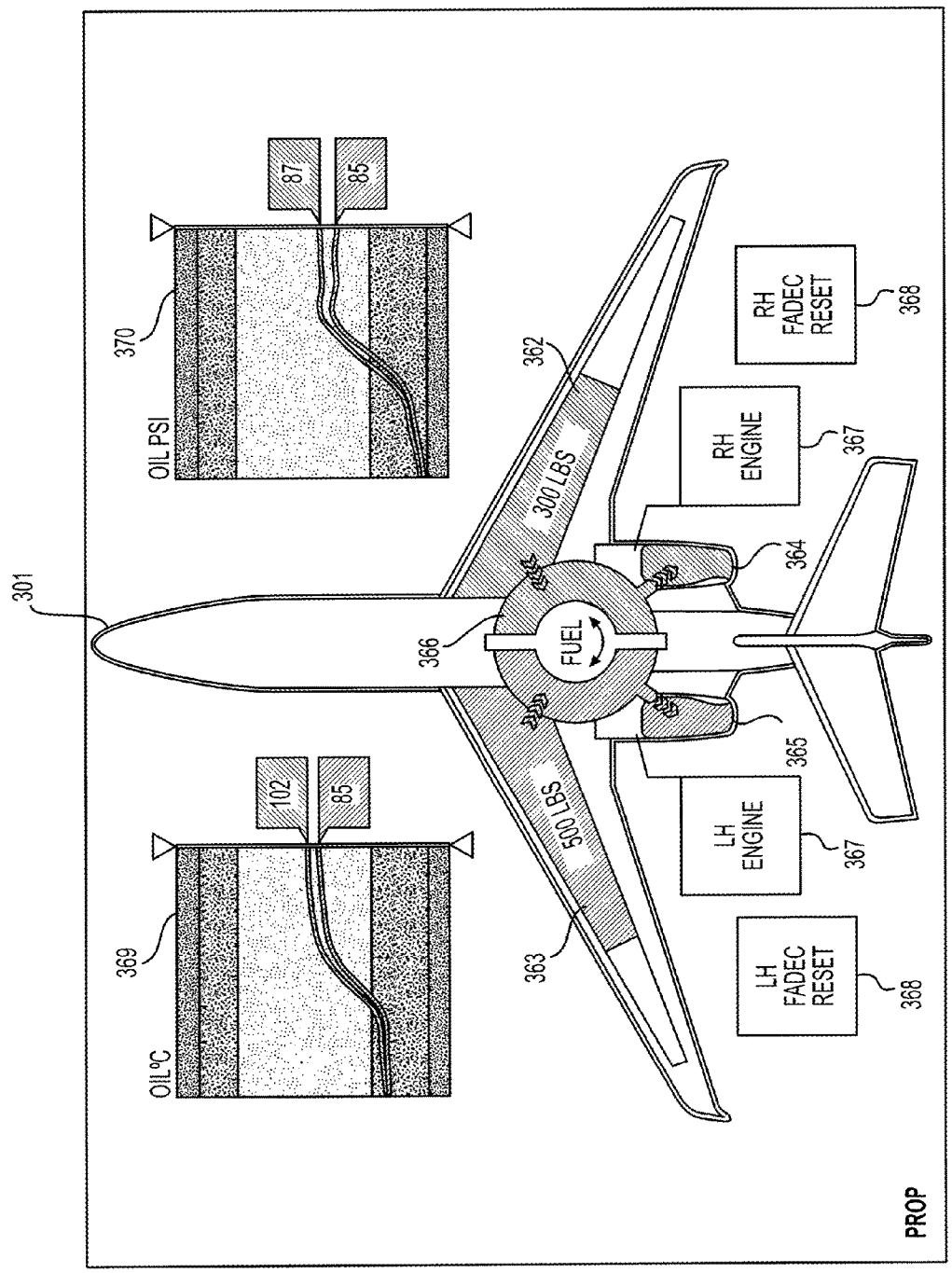
FIG. 3I depicts an embodiment of a synoptic user interface for aircraft propulsion systems.

FIG. 3I depicts a synoptic user interface panel for aircraft propulsion systems. In this embodiment a top view 301 is depicted, though in other embodiments a side view may be more appropriate depending on aircraft configuration. Various components of the fuel and propulsion systems of the aircraft are depicted on the top view of an aircraft shown on FIG. 3I, such as fuel tanks 362 and 363, engines 364 and 365, and a symbolic representation 366 of the fuel flow from the fuel tanks to the engines. The fuel tanks may be provided with graphical and textual elements conveying the amount of fuel left in the tank, such as the number of remaining pounds (lbs) of fuel. In some embodiments a color may be associated with each fuel tank, and the area highlighted in this color may vary to indicate graphically the amount of fuel remaining in each tank. Similarly the flow of fuel from each tank to each engine may be highlighted with the color associated with each tank. In some embodiments one or more buttons 367 may be provided to access further information about an element of the system such as the engines. Similarly, one or more buttons 368 may be provided. In some embodiments, graphical displays of parameters may depicted, such as graph 369 depicting the oil temperature of each engine over time, and graph 370 depicting the oil pressure of each engine over time.

Figure 3J:
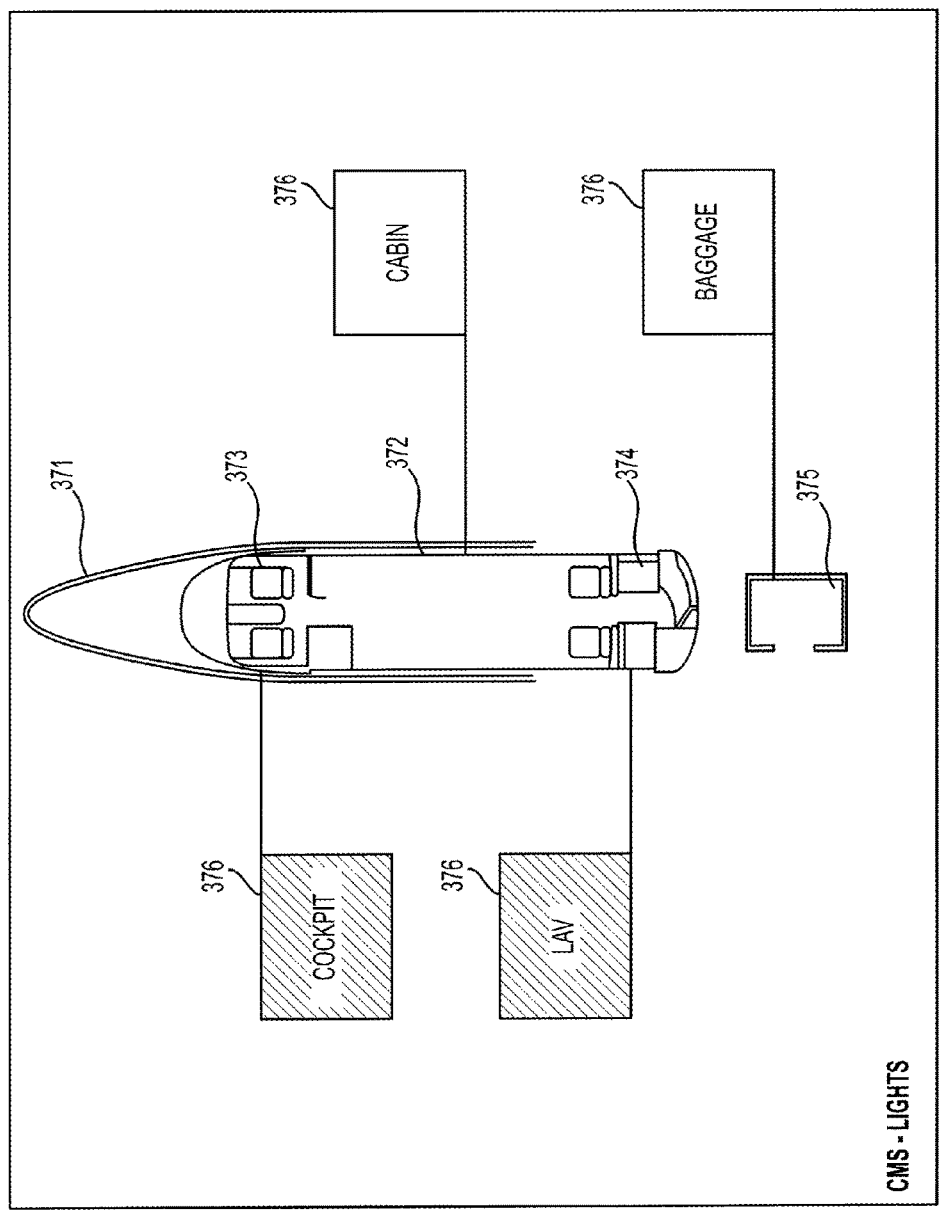
FIG. 3J depicts an embodiment of a synoptic user interface for aircraft internal lights.

FIG. 3J depicts an embodiment of a synoptic user interface panel for aircraft internal lights. The user interface is provided with a full or partial top schematic depiction 371 of an aircraft. In some embodiments, the depiction 371 may be provided with spot lights at each light location that flood (cast light) into areas the light is to illuminate within the aircraft when the light is on. When the light is off, the light cup is present but not casting light. In some embodiments, when the lights of an area of the aircraft are turned off, that area is shown in black, as the Cabin area 372 is depicted in FIG. 3J. In some embodiments, when the lights are turned on in an area of the aircraft, the area is shown with a lighted schematic of the interior of the aircraft, as the Cockpit area 373 and the Lavatory area 374 depicted in FIG. 3J. Other areas of the aircraft outside the cabin may be shown as well, either schematically or symbolically, such as baggage area 375. In some embodiments, buttons 376 for each light or lighting area within the aircraft may be provided. Each button 376 may be connected to the respective light or area of the aircraft with a line, and the color of the button 376 may provide a status indicator for the light or lighted area. For example, green buttons 376 may represent that the light or lights are turned on, and gray or transparent buttons 376 may represent that the light or lights are turned off. Other colors may be used to represent malfunctions or other states. In some embodiments, a user may be able to turn a light or lights off by touching the button 376 that corresponds to the light or lights to be activated or deactivated.

Figure 3K:
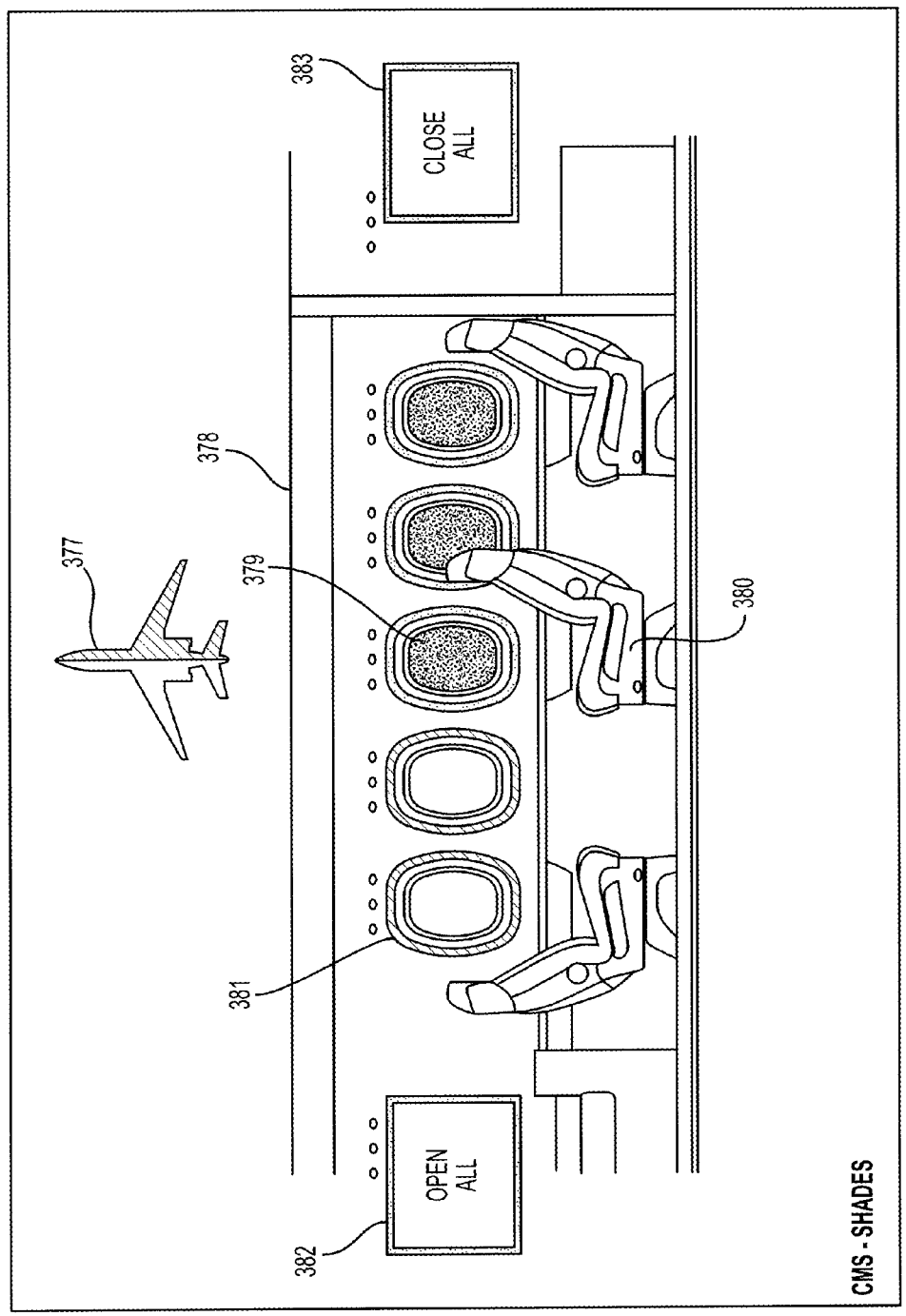
FIG. 3K depicts an embodiment of a synoptic user interface for aircraft cabin window shades.

FIG. 3K depicts an embodiment of a synoptic user interface panel for aircraft cabin window shades. In some embodiments of this user interface, a top view 377 of an aircraft is depicted. The top view 377 allows a user to select which side of the aircraft cabin will be displayed in the user interface by touching the appropriate side of top view 377. Additionally, the color of a portion of the top view 377 may change to indicate which side of the cabin is currently depicted below. In other embodiments of this user interface, top view 377 may not be present and both sides of the aircraft cabin may be depicted simultaneously. The side view 378 of a portion of the aircraft cabin depicts each window 379 in the cabin and may also show other features of the cabin interior such as seats 380. The color of each window 379 may be modified to show the state of the shade at each window. For example, an open shade may be represented by a white window 379, while a closed shade may be represented by a black window 379. In some embodiments, an interface panel may be provided for raising, lowering, activating, and deactivating cabin video and audio displays, and selecting and displaying video and audio content on such cabin displays.

In some embodiments, an additional status ring 381 may be provided around each window 379. The color of the status ring 381 may provide additional information regarding the status of the window. A user may individually raise and lower a window shade by touching the window 379. In some embodiments, additional buttons 382 and 383 may be provided to allow a user to open or close, respectively, all shades simultaneously.

In other embodiments, the TSIP 210 may provide access to control additional types of cabin or aircraft functions, or provide additional information to the users. The user interfaces described herein are not limiting but exemplary of the types of synoptic user interfaces contemplated within the inventive system.

In some embodiments of the system, the various windows may be opened, closed, and moved around the TSIP 210. A user may "drag" or move the window by touching the window in a certain area and moving a finger across the TSIP 210 while maintaining contact with the TSIP 210. In some embodiments, once the finger is lifted from the TSIP 210 the window stops moving, though in other embodiments the window may have emulated momentum to continue moving for some additional distance if the finger is moving when lifted from the TSIP 210. In various embodiments, the areas that a user may touch to drag the window or page may include the title bar (if present), the border (if present), or any portion of the window that does not comprise an active control such as a button.

In some embodiments, the windows may overlap or overlay one another to allow the user to maximize the use and efficiency of the TSIP 210. A user may bring a window to the foreground by touching the window, and may move it in front of another window by dragging it to a location that wholly or partially overlaps another window shown on the TSIP 210. In some embodiments, a user must bring a window to the foreground position on the TSIP 210 before activating an active control located in the window.

In some embodiments the system does not allow a user to move windows into certain areas of the TSIP 210, such as areas that display primary flight controls or other information that must be visible for the safe operation of the aircraft. In some embodiments for a single pilot application, the pilot could open multiple synoptic pages or windows and arrange them on the co-pilot Multi-Function Display (MFD) area of the TSIP 210. The flight crew may open multiple synoptic pages or windows and arrange them by physically moving them on the TSIP 210 as they see fit to help maintain a higher state of situational awareness.

In some embodiments of the user interfaces, a user may need to fix a user interface panel in a certain place on the TSIP 210. This may be necessary to prevent accidental movement of user interface panels, or because some user interface panels may be completely covered with an active control such as a map that cannot be activated when the window is capable of being dragged across the TSIP 210. In those embodiments, the user is provided with a method of "pinning" a user interface panel in place on TSIP 210 such that the user interface panel is not movable from its current location on the screen until it has been "unpinned".

Figure 3L:
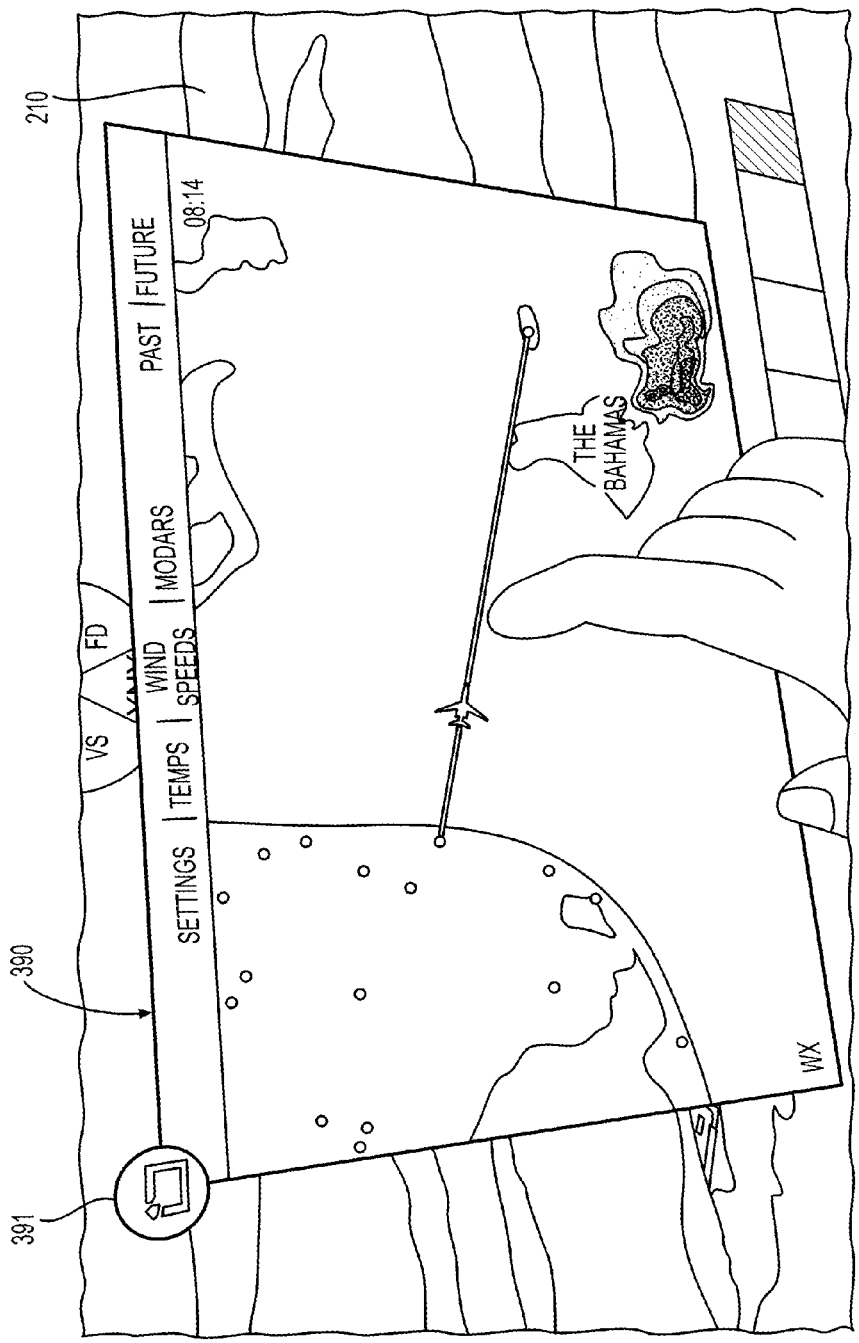
FIG. 3L depicts an embodiment of a pinnable synoptic user interface.
Figure 3M:
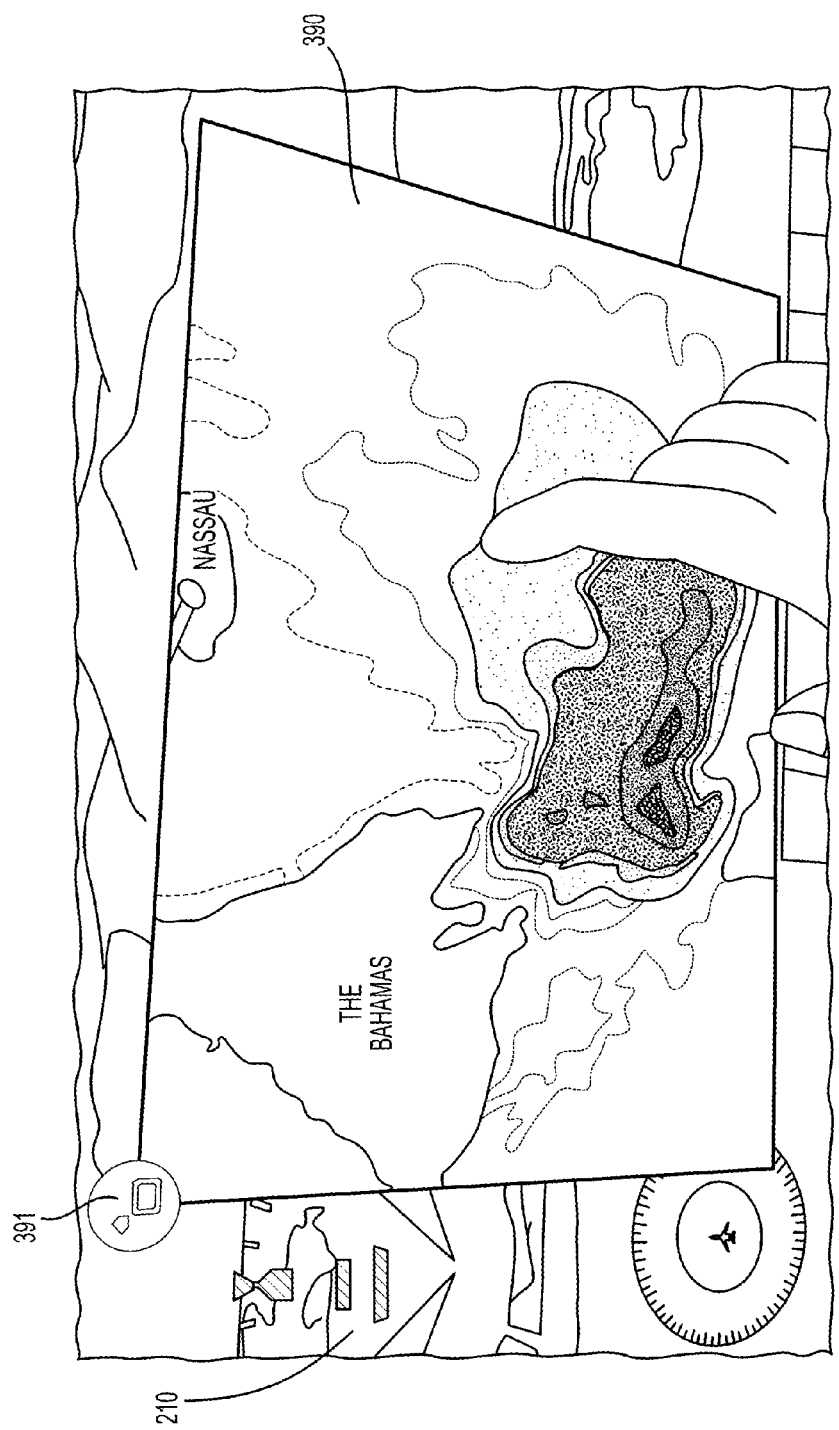
FIG. 3M depicts an embodiment of a pinnable synoptic user interface.

Referring now to FIGS. 3L and 3M, a user interface panel is depicted with an embodiment of the pinning functionality. In this example, a mapping or weather function is displayed in the panel 390. At some times the user may want to move the panel 390 to a desired location on the TSIP 210, while at other times the user may want to alter the contents of the panel 390 to display different portions of a map within panel 390. The touch input required for both changes may be the same, for example, touching the TSIP 210 and dragging a finger across the panel 390. The panel 390 is provided with a pin icon 391 which may be touched by a user to toggle the pin function on and off.

In FIG. 3L, the pin icon 391 is not highlighted and the pin function is inactive. When the user touches the screen within the panel 390 and moves a finger, the entire panel 390 will move on the TSIP 210. The contents of the panel 390 will not change as the panel 390 moves across the TSIP 210 in response to the users touch input. When the user has moved the panel 390 to the desired location, the pin icon 391 is touched to activate the pin function and prevent further movement of the panel 390 on the TSIP 210.

In FIG. 3M, the pin icon is highlighted as a result of the users touch input. As the user touches the TSIP 210 within the area of panel 390, and drags a finger across the screen of the TSIP 210, the content of the panel 390 changes in response to that movement. For example, the user may pan a map within the panel 390 by dragging a finger within panel 390, or pinch two fingers together on the screen to zoom in on the content. When a user desires to move the panel 390 to a different location on the TSIP 210 they touch the pin icon 391 to deactivate the pin function, and then the panel 390 will move on TSIP 210.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed is:

1. A method for controlling an aircraft having a touch screen instrument panel and an onboard computer connected to the touch screen instrument panel, comprising the steps of:

displaying at least one synoptic user interface panel graphically depicting at least a portion of the aircraft on a portion of the touch screen instrument panel;

overlaying the at least one synoptic user interface panel on a panoramic real-time image displayed on the touch screen instrument panel, wherein the real-time image is captured by a forward-facing camera mounted to the aircraft;

moving the at least one synoptic user interface panel to a desired location on the touch screen instrument panel;

fixing the at least one synoptic user interface panel to remain in the desired location on the touch screen instrument panel while receiving touch input;

providing information via at least one display element associated with a graphically depicted portion of the aircraft from the onboard computer via the at least one synoptic user interface panel;

receiving control input via the graphically depicted portion of the aircraft to the onboard computer through the at least one synoptic user interface panel;

modifying a state of a component of the aircraft in response to the control input; and updating the at least one display element associated with the graphically depicted portion to match the state of the component following the step of modifying the state of the component.

2. The method of claim 1 wherein the panel symbolically depicts all or a portion of an aircraft.

3. The method of claim 1 wherein the at least one display element depicts a component of the aircraft in relation to the graphical depiction of the aircraft.

4. The method of claim 3 wherein the step of providing information comprises displaying values on the at least one synoptic user interface panel from the onboard computer corresponding to a component of the aircraft in relation to the display element depicting the component.

5. The method of claim 4 wherein a first panel selected from the at least one synoptic user interface panel partially overlays a second panel selected from the at least one synoptic user interface panel.

6. The method of claim 4 further comprising the step of automatically updating the values from the onboard computer displayed on the display element to represent the state of the aircraft.

7. The method of claim 6 wherein the display elements are automatically modified by altering the color, text or numerical value, shape, or configuration of the display element to represent the state of the aircraft.

8. The method of claim 3 wherein the step of receiving control input comprises the steps of:

sensing a touch input on the portion of the touch screen instrument panel on which the at least one synoptic user interface panel is displayed; and determining the display element associated with the touch input.

9. The method of claim 8 wherein the step of modifying the state of the aircraft comprises the steps of:

determining the component of the aircraft depicted by the display element associated with the touch input; and modifying the state of the component of the aircraft in response to the touch input.

10. The method of claim 3 wherein the step of receiving control input comprises sensing a touch input on the at least one display element.

11. The method of claim 10 wherein the at least one display element depicts a control surface of the aircraft; and the step of modifying the state of the aircraft comprises repositioning the control surface.

12. The method of claim 10 wherein the at least one display element depicts an internal or external light; and the step of modifying the state of the aircraft comprises turning the internal or external light on or off.

13. The method of claim 10 wherein the at least one display element depicts an electrical component; and the step of modifying the state of the aircraft comprises actuating the electrical component.

14. The method of claim 13 wherein the electrical component is selected from the group consisting of a power generator, a relay, and an electrical bus.

15. The method of claim 10 wherein the at least one display element depicts a hydraulic valve, a pneumatic valve, or a fuel valve; and the step of modifying the state of the aircraft comprises opening or closing the valve.

16. The method of claim 1 wherein the at least one synoptic user interface panel is selected from the group consisting of an anti-icing systems panel, an environmental control systems panel, an electrical systems panel, a flight control panel, an hydraulic systems panel, an exterior light panel, an oxygen systems panel, a cabin pressurization panel, a propulsion systems panel, an internal light panel, and a cabin window shade panel.

17. The method of claim 1 further comprising the step of dragging the at least one synoptic user interface panel to any desired location on the touch screen instrument panel.

18. The method of claim 1 wherein the at least one display element is an icon associated with the depiction of all or a portion of an aircraft.

19. The method of claim 18 wherein the step of receiving control input comprises sensing a touch input on the icon.

20. The method of claim 19 wherein the icon is associated with an anti-icing system; and the step of modifying the state of the aircraft comprises turning the anti-icing system on or off.

21. The method of claim 19 wherein the icon is associated with the temperature of a portion of the aircraft, and the step of modifying the state of the aircraft comprises increasing or decreasing the temperature settings for the portion of the aircraft; and, the step of updating the at least one display element comprises displaying the updated temperature.

22. The method of claim 19 wherein the icon is associated with the position of a control surface for the aircraft, and the step of modifying the state of the aircraft comprises repositioning the control surface; and, the step of updating the at least one display element comprises displaying the updated position of the control surface.

23. The method of claim 22 wherein the control surface for the aircraft comprises a flap, and the graphically depicted portion of the aircraft displays a graphical image of the flap position; and, the display element shows a numerical value of the flap angle such that the at least one synoptic user interface panel replaces a flap handle lever of the aircraft.

24. The method of claim 19 wherein the icon is associated with an aircraft system selected from a hydraulic system, a lighting system, an oxygen system, a climate control system, a fuel system, and a cabin control system; and the step of modifying the state of the aircraft comprises modifying a component in the aircraft system.

25. A method for controlling an aircraft having a touch screen instrument panel and an onboard computer connected to the touch screen instrument panel, comprising the steps of:

displaying at least one synoptic user interface panel on a portion the touch screen instrument panel;

providing information about the aircraft from the onboard computer via the at least one synoptic user interface panel;

receiving control input to the onboard computer through the at least one synoptic user interface panel;

modifying the state of the aircraft in response to the control input;

dragging the at least one synoptic user interface panel to a desired location on the touch screen instrument panel;

actuating an icon displayed in the at least one synoptic user interface panel to pin the at least one user interface panel in the desired location preventing the at least one synoptic user interface panel from being moved from the desired location;

touching the touch screen instrument panel in the area depicting the at least one synoptic user interface panel to manipulate the information provided on the at least one synoptic user interface panel; and actuating the icon to unpin the at least one user interface panel allowing the panel to be moved from the desired location.

26. A method for controlling an aircraft having a touch screen instrument panel and an onboard computer connected to the touch screen instrument panel, comprising the steps of:

displaying at least one synoptic user interface panel on a portion the touch screen instrument panel;

providing information about the aircraft from the onboard computer via the at least one synoptic user interface panel;

receiving control input to the onboard computer through the at least one synoptic user interface panel;

actuating an icon displayed in the at least one synoptic user interface panel to pin the at least one user interface panel in a desired location preventing the at least one synoptic user interface panel from being moved from the desired location;

touching the touch screen instrument panel in the area depicting the at least one synoptic user interface panel to manipulate the information provided on the at least one synoptic user interface panel; and actuating the icon to unpin the at least one user interface panel allowing the panel to be moved from the desired location.

* * * * *